C. L. BRAINARD.
MILK STRAINER.
APPLICATION FILED FEB. 1, 1918. RENEWED DEC. 18, 1918.
1,314,042.
Patented Aug. 26, 1919.
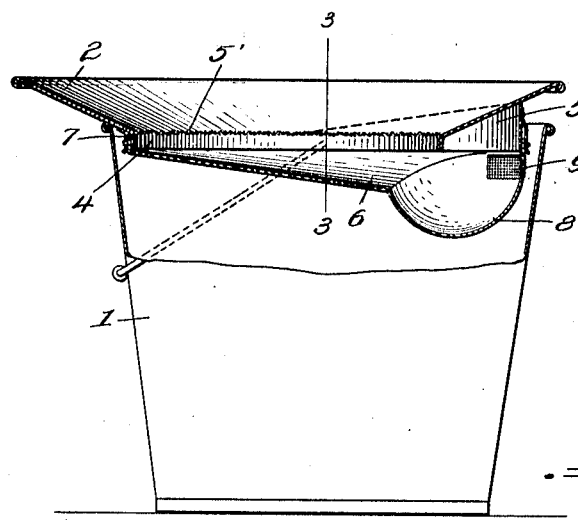
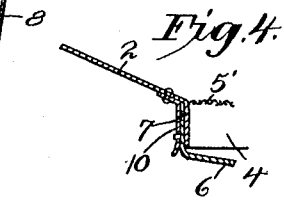
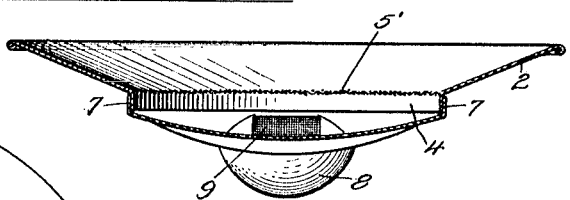
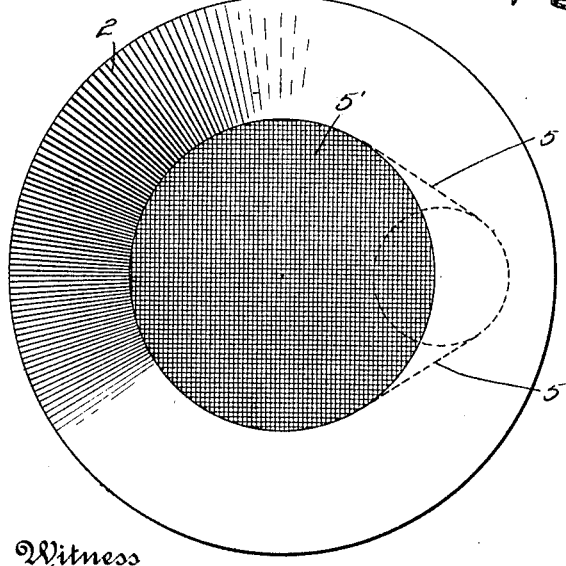
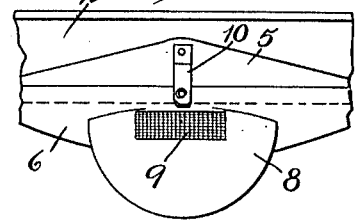
Inventor
C. L. Brainard.
Witness
F. C. Gibson.
S. B. Middleton.
By Victor J. Evans
Attorney

UNITED STATES PATENT OFFICE.

CLAUDE L. BRAINARD, OF MOUNT VERNON, SOUTH DAKOTA.

MILK-STRAINER.

1,314,042.

Specification of Letters Patent.

Patented Aug. 26, 1919.

Application filed February 1, 1918, Serial No. 214,973. Renewed December 18, 1918. Serial No. 267,403.

*To all whom it may concern:*

Be it known that I, CLAUDE L. BRAINARD, a citizen of the United States, residing at Mount Vernon, in the county of Davison and State of South Dakota, have invented new and useful Improvements in Milk-Strainers, of which the following is a specification.

This invention relates to new and useful improvements in milk strainers, and the principal object of the invention is to provide a strainer adapted to be placed over the milk pail to receive the milk before it enters said pail.

Another object of the invention is to provide a sediment chamber below the strainer and to provide a strainer in the upper part of said chamber so that the milk can escape therefrom into the pail.

A further object of the invention is to so locate the straining medium that the milk will come in direct contact therewith so as to prevent spattering of the milk.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal section through a milk pail with my improvement therein.

Fig. 2 is a plan of the strainer.

Fig. 3 is a section on line 3—3 of Fig. 1.

Fig. 4 is a sectional detail view showing the connecting means.

Fig. 5 is a detail view of one side of the device also showing said connecting means.

In these views 1 designates the pail which may be of any desired size and shape, provided with the usual bail and handle. My strainer is adapted to be placed on the top of said pail so as to receive the milk before it enters the pail and said strainer comprises a cylindrical tray shaped member 2 provided with a cylindrical element 4 on its lower side to which the wire gauze 5' is secured. The part 2 slopes downwardly toward said cylindrical part, the said cylindrical part being of ring shape and bounding the opening covered by the gauze. At one side of the strainer I extend converging walls 5 downwardly from the bottom of the part 2, said walls beginning at a point on a line with the cylindrical part 4 and passing upwardly at an angle to the meeting point substantially mid-way the edges of the tray part 2 and the lower edges of said walls are in the same horizontal plane as the lower edge of the cylindrical part 4. It will thus be seen that this cylindrical part has an extension projecting beyond one part thereof and extending up to the bottom of the tray part 2 as clearly shown in the figures.

6 represents the removable bottom of the strainer which is provided with a straight upper edge 7 adapted to fit over the cylindrical part 4 and the lower edges of the walls 5 and said bottom at one edge thereof are directly below the walls 5 and the rest of said bottom inclines toward said depression. The upper edge of said depression immediately below the straight part 7 is provided with an opening covered by wire gauze 9. The bottom member 6 is held in position on the strainer by means of the spring catches 10.

When the strainer is in position on the milk pail and the cow is being milked the milk will strike the wire gauze and thus be prevented from spattering. It will pass through the said gauze and drop on to the bottom member 6 where it will accumulate in the depression 8. As it rises in this depression it will reach the opening covered by the gauze 9 and will pass therethrough into the pail. Any sediment passing through the strainer will be caught in the depression 8 and thus be prevented from entering the pail.

It is thought from the foregoing description that the advantages and novel features of my invention will be readily apparent.

I desire it to be understood that I may make slight changes in the construction and in the combination and arrangement of the several parts, provided that such changes fall within the scope of the appended claims.

What I claim is:—

1. A milk strainer comprising a tray adapted to set over the top of the milk pail and having a straining medium in its bottom and a part detachably connected with the bottom of said tray and having a sediment chamber located to one side of said straining medium.

2. A milk strainer comprising a tray shaped member having a straining medium in its bottom, a bottom member detachably connected with said tray below the straining medium and having a depression therein located to one side of the straining medium and forming a sediment chamber, said chamber having an opening in its upper part and a straining medium covering said opening.

3. A milk strainer comprising a tray shaped member having a cylindrical lower part, a straining medium carried by said part, a bottom member having a depression at one side thereof partly located under the solid part of the tray, a gauze covered opening in the upper part of said depression and said bottom member having an inclined wall leading to said depression.

In testimony whereof I affix my signature.

CLAUDE L. BRAINARD.